United States Patent [19]

Nishihara et al.

[11] Patent Number: 4,969,715

[45] Date of Patent: Nov. 13, 1990

[54] DEVICE FOR SUPPORTING OBJECT LENS IN OPTICAL HEAD

[75] Inventors: Hikaru Nishihara; Hiroshi Ogata; Tatsuhiro Yoshimune; Kaoru Nishimura, all of Hiroshima, Japan

[73] Assignee: Sharp Kabushiki Kaisha, Osaka, Japan

[21] Appl. No.: 324,687

[22] Filed: Mar. 17, 1989

[30] Foreign Application Priority Data

Mar. 17, 1988 [JP] Japan .............................. 63-36014[U]

[51] Int. Cl.⁵ ................................................ G02B 7/02
[52] U.S. Cl. ..................................... 350/255; 350/247; 369/44.11
[58] Field of Search ....................... 350/247, 255, 257; 369/44, 45, 46

[56] References Cited

U.S. PATENT DOCUMENTS 4,766,583 8/1988 Oinoue et al. ...................... 350/247
4,813,033 3/1989 Baasch et al. ......................... 369/45

FOREIGN PATENT DOCUMENTS 62-283430 12/1987 Japan .

Primary Examiner—Bruce Y. Arnold
Assistant Examiner—Loha Ben

[57] ABSTRACT

A device for supporting an object lens in an optical head includes a substantially parallelepipedic link mechanism (5), a rotatable member (16) rotatable in the parallelepiped, a second hinge member (15) connecting the rotatable member (16) to the inner wall of one plate (10) of the link mechanism (15) to make it possible to rotate the rotatable member about an axis parallel to the optical axis of the object lens (1), a lens holding member (2) supported by the rotatable member (16) and holding the object lens (1), and a base (17) for substantially holding another plate (12) of the link mechanism.

10 Claims, 4 Drawing Sheets

DEVICE FOR SUPPORTING OBJECT LENS IN OPTICAL HEAD

BACKGROUND OF THE INVENTION

1. Field of the Invention

This invention relates to an optical head employed in an optical information recording/reproducing apparatus such as an optical disk player, and more particularly, to an improvement in a device for supporting an object lens.

2. Description of the Prior Art

FIG. 1 is a longitudinal sectional view of an optical head disclosed in the Japanese Patent Laying-Open No. 283430/1987, and FIG. 2 is an exploded perspective view of the optical head shown in FIG. 1. Referring to these figures, a yoke member 112 formed from a sheet material is attached to a base 111. A link member 113 cast in a mold is attached via pins 114 to the yoke member 112.

A holding member 117 holding an object lens 115 and a semiconductor device 116 is attached to the forward end of the link member 113. A lid 118 having an opening 118a is attached to the holding member 117. A mirror 121 is attached to the lid 118 for closing the opening 118a. The semiconductor device 116 includes a semiconductor laser for emitting a laser beam 143 and a photosensor for sensing the laser beam reflected from a disk 144.

The link member 113 includes hinges 113a for swinging the holding member 117 along the direction of the optical axis of the object lens 115, as indicated by chain dotted lines in FIG. 1, for effecting focusing adjustment, and also includes a hinge 113b for swinging the holding member 117 along the direction normal to the optical axis of the object lens 115, for effecting tracking adjustment. Also, a counterbalance 122 is balanced against to the holding member 117 at a portion opposite to the object lens 115 with respect to the hinge 113b, for preventing the holding member 117 from being turned about the hinge 113b when the optical head is tilted in its entirety.

The yoke member 112 is provided with upstanding plate sections 112a, 112b, formed by bending. A magnet 123 is mounted to a surface of the upstanding plate section 112a confronting to the upstanding plate section 112b. A focusing coil 124 is attached to the holding member 117 for surrounding the upstanding plate section 112b. A tracking coil 125 is attached to the focusing coil 124 for confronting to the magnet 123.

Two sets each of the upstanding plate sections 112a, 112b, magnet 123, focusing coil 124 and tracking coil 125 are arranged symmetrically to each other with respect to the hinge member 113.

The semiconductor device 116, focusing coil 124 and the tracking coil 125 are connected electrically to the outside through a flexible wiring board or substrate 126.

The hinge member 113 and the holding member 117 are covered by a cap 127 having an opening 127a at a position above the object lens 115.

In the above described conventional supporting device for supporting the object lens of the optical head, the link member 113, hinge 113b and object lens 115 are arrayed along a straight line in sequence without overlapping. Hence, the object lens supporting device has a longer length, resulting in a larger size of the overall optical head.

Also, the counterbalance 122 must be inserted in the link mechanism to complete the object lens supporting device, after formation of the link mechanism including the link member 113 and the hinge 113a, thus complicating the manufacture process for the object lens supporting device.

SUMMARY OF THE INVENTION

In view of the above described prior art, it is an object of the present invention to provide a device for supporting an object lens in an optical head, which is compact in size and can be assembled easily.

In an aspect of the present invention, an object lens supporting device, wherein an object lens may be displaced within an optical head in both the direction along the optical axis of the lens and the direction normal to the optical axis, includes a link mechanism having substantially the form of a parallelepiped. The parallelepiped form makes it possible to displace the lens in a direction along the optical axis. The link mechanism having four plates and a first hinge mechanism including four hinges interconnecting the four plates. A rotatable member is rotatable within the parallelipiped. A second hinge mechanism connects the rotatable member to the inner wall of one of the four plates to make it possible to rotate the rotatable member about an axis parallel to the optical axis. A lens holding device is supported by the rotatable member and adapted for holding the object lens. A base for holding stationarily another of the plates facing to the one plate holding the second hinge mechanism.

In another aspect of the invention, an object lens supporting device, wherein an object lens may be displaced within an optical head in both the direction along the optical axis of the lens and the direction normal to the optical axis, include a link mechanism having substantially the form of a parallelepiped and making it possible to displace the lens in the direction along the optical axis. The link mechanism having four plates and a first hinge mechanism including four hinges interconnecting the four plates. A supporting member is provided in the parallelepiped for supporting the link mechanism. A second hinge mechanism connects the inner wall of one of the four plates to the supporting member to make it possible to rotate the link mechanism about an axis parallel to the optical axis. A lens holding device supported by another of the plates facing to said one plate connected to said second hinge mechanism. The lens holding device being adapted for holding the object lens. A base for holding stationarily the supporting member.

Hence, in the object lens supporting device of the present invention, the object lens may be displaced along the optical axis by the link mechanism, and also in a direction normal to the optical axis by the second hinge mechanism.

Also, in the object lens supporting device of the present invention, the second hinge mechanism is accommodated in the link mechanism, so that the lens supporting device is more compact in size than the conventional device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
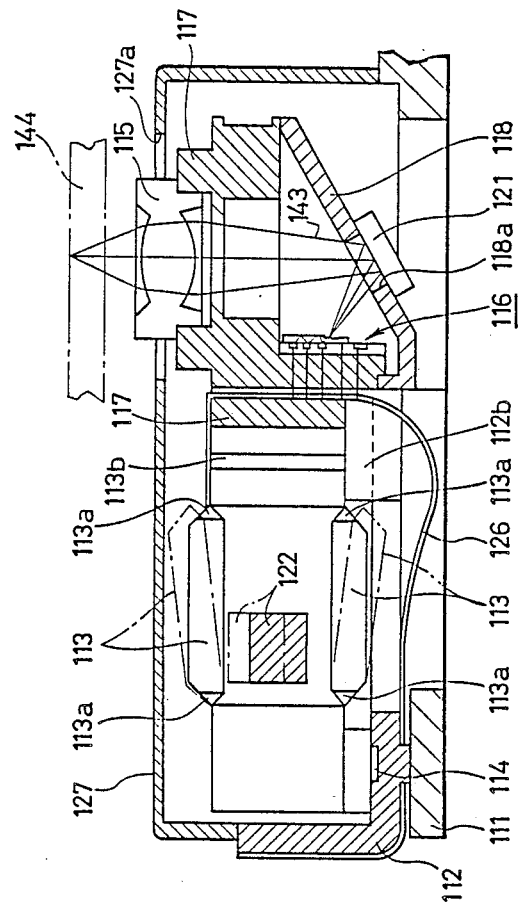
FIG. 1 is a longitudinal sectional view diagrammatically showing a conventional optical head.
Figure 2:
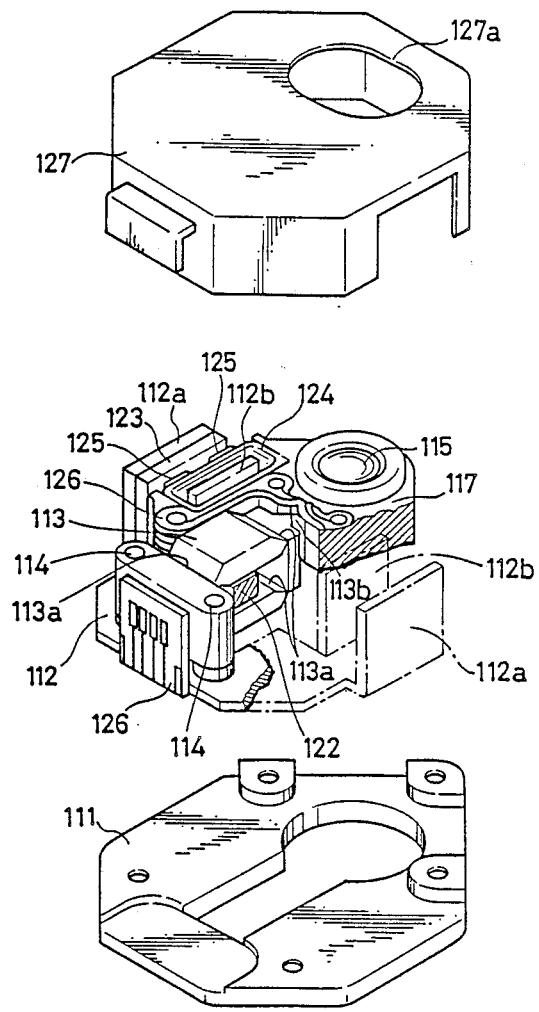
FIG. 2 is an exploded perspective view of the optical head shown in FIG. 1.
Figure 3:
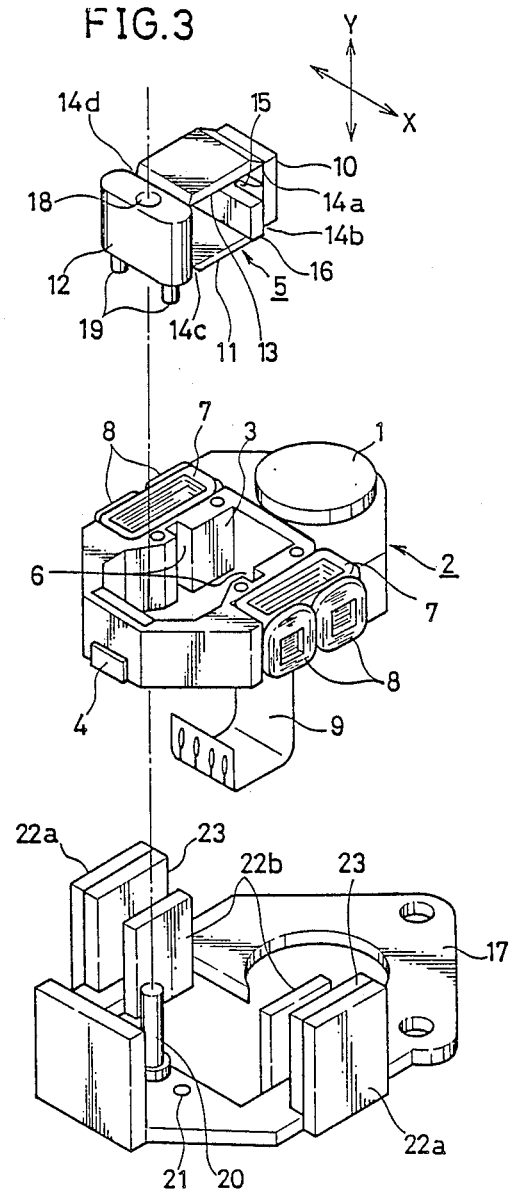
FIG. 3 is an exploded perspective view of a lens supporting device according to an embodiment of the present invention.

Referring to FIG. 3, an object lens 1 is fixed to a lens supporting member 2. The lens supporting member 2 is substantially ring-shaped, and a counterbalance 4 is affixed to the side of the member 2 opposite to the object lens 1 with respect to an opening 3. A link mechanism 5 is inserted into the opening 3. The both ends of a rotatable plate 16 connected to the link mechanism 5 are inserted and fixed in a pair of slots 6 formed on the inner wall of the opening 3, whereby the lens supporting member 2 is supported by the link mechanism 5. Focusing coils 7 and tracking coils 8 are attached to the lens supporting member 2 and are connected to an external circuit through a flexible print board or substrate 9.

Figure 4:
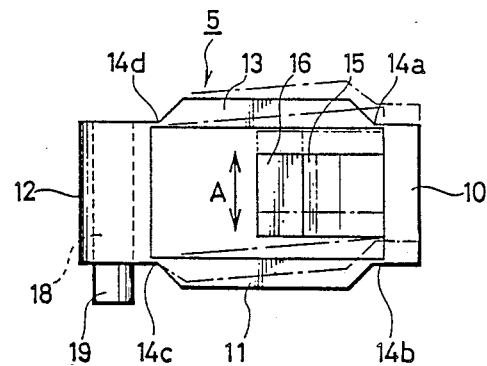
FIG. 4 is an enlarged side elevation showing the link mechanism and second hinge mechanism shown in FIG. 3.
Figure 5:
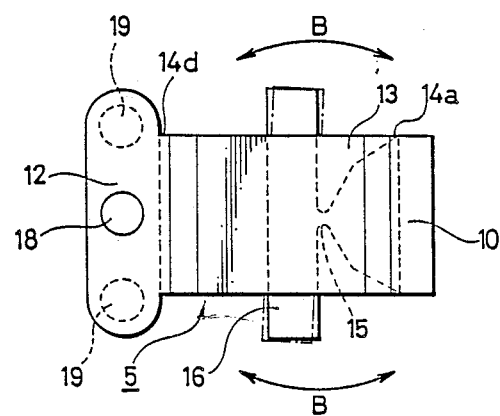
FIG. 5 is a top plan view showing the link mechanism and second hinge mechanism shown in FIG. 4.

As shown in more detail in FIGS. 4 and 5, the link mechanism 5 is molded from a soft synthetic region material. Four link plates 10, 11, 12 and 13 are arranged in the form of a parallelepiped and interconnected by four hinges 14a, 14b, 14c and 14d of a first hinge group having a first rotatable axis. A rotatable plate 16 is connected to the inner lateral side of the link plate 10 by a hinge 15 of a second hinge group having a second rotatable axis parallel to the surface of the link plate 10 and normal to the first axis of the first group hinges 14a to 14d. The rotatable plate 16 has its both ends inserted and fixed in the pair of slots 6 formed in the lens supporting member 2. The link plate 12 facing to the link plate 10 is provided with a through-hole 18 and pins 19 for engaging with the base 17. The base 17 has a pin 20 and holes 21 for engaging with the hole 18 and the pin 19 of the link plate 12, respectively. The link mechanism 5 is securely held on the base 17 through the intermediary of these engaging means 18–21. The base 17 is also provided with yokes, 22a, 22b and magnets 23 constituting magnetic circuits in cooperation with the focusing coils 7 and the tracking coils 8.

As seen from FIG. 4, the parallelepipedic link mechanism 5, constituted by the link plates 10 to 13 and the first group hinges 14a to 14d, can be displaced as indicated by chain dotted lines. Thus, the link plate 10 can be moved up and down as indicated by an arrow mark A with respect to the link plate 12 secured to the base 17, whereby the object lens 1 can be displaced along the optical axis, as indicated by an arrow mark Y in FIG. 3, together with the lens supporting member 2. The rotatable plate 16 can be rotatively displaced, with the second group hinge 15 as center, as indicated by chain dotted lines and by an arrow mark B in FIG. 5. Thus, the object lens 1 can be rotated along with the lens supporting member 2 about the second group hinge 15 as center, this displacement being that in the tracking direction as indicated by an arrow mark X in FIG. 3. Thus, the object lens 1 can be displaced in both the focusing direction Y and the tracking direction X, and the focusing and tracking can be controlled appropriately under the driving force of magnetic circuits constituted by the coils 7, 8, yokes 22a, 22b and magnets 23.

In the device shown in FIG. 3, inasmuch as the second group hinge 15 and the rotatable plate 16 are provided in the parallelepipedic link mechanism 5 made up of the link plates 10 to 13 and the first group hinges 14a to 14d, the lens supporting device may be made more compact than the conventional device. There is also no necessity of inserting the counterbalance 4 into the link mechanism 5 for assembling. Hence the counterbalance 4 can be attached to the lens supporting member 2 in a process step which is separate from the step of securing the link mechanism 5 to the base 17. It is also possible to have the counterbalance 4 formed simultaneously with the lens supporting member 2. The ring-shaped lens supporting member 2 has a mechanical strength higher than that of the conventional lens supporting member.

In the above embodiment, the link plate 12 of the link mechanism 5 is secured to the base 17 and the rotatable plate 16 holds the lens supporting member 2. However, as will be apparent to those skilled in the art, the link plate 12 may hold the lens supporting member 2 and the rotatable plate 16 may be secured to the base 17.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An object lens supporting device in an optical head having an object lens movable in both a first direction along an optical axis of the lens and a second direction normal to the optical axis, said device comprising:
    a link mechanism means having substantially the form of a parallelepiped for adjusting the lens in said first direction along said optical axis, said link mechanism means including four plate and a first hinge means for interconnecting said four plates, said hinge means having four hinges;
    a rotatable member rotatable in the parallelepiped shaped link mechanism means;
    second hinge means connecting said rotatable member to the inner wall of one of said four plates enabling said rotatable member to pivot about an axis parallel to said optical axis;
    lens holding means supported by said rotatable member and adapted for holding the object lens; and
    a base for holding stationarily another of said plates facing to said one of said plates holding said second hinge means.

2. The lens supporting device according to claim 1, wherein said link mechanism means is cast integrally by molding a soft synthetic resin material.

3. The lens supporting device according to claim 2, wherein said link mechanism means, said second hinge means and said rotatable member are cast integrally by molding a soft synthetic resin material.

4. The lens supporting device according to claim 3, wherein said rotatable member is in the form of a plate having both ends inserted into a pair of slots formed on the inner wall of said opening.

5. The lens supporting device according to claim 1, wherein said lens holding means includes an opening and said link mechanism means is inserted in said opening.

6. The lens supporting device according to claim 4, wherein said lens holding means is provided with a counterbalance means for counterbalancing with respect to the pivot axis of said second hinge means.

7. The lens supporting device according to claim 1, further comprising pin means for securing said base to said plate.

8. An object lens supporting device in an optical head having an object lens adjustable in both a first direction along an optical axis of the lens and a second direction normal to the optical axis, said device comprising:
  a link mechanism means having substantially the form of a parallelepiped for adjusting the lens in said first direction along said optical axis, said link mechanism means including four plates (10, 11, 12, 13) and first hinge means for interconnecting said four plates, said first hinge means having four hinges;
  a supporting member provided in said parallelepiped for supporting said link mechanism means;
  second hinge means connecting the inner wall of one of said four plates to said supporting member for pivoting said link mechanism means about an axis parallel to said optical axis;
  lens holding means supported by another of said plates facing said one of said plates connected to said second hinge means, said lens holding means being adapted for holding said object lens; and
  a base for holding stationarily said supporting member.

9. The lens supporting device according to claim 8, wherein said link mechanism means is cast integrally by molding a soft synthetic resin material.

10. The lens supporting device according to claim 9, wherein said link mechanism means, said second hinge means and said supporting member are cast integrally by molding a soft synthetic resin material.

* * * * *